Patented Aug. 31, 1954

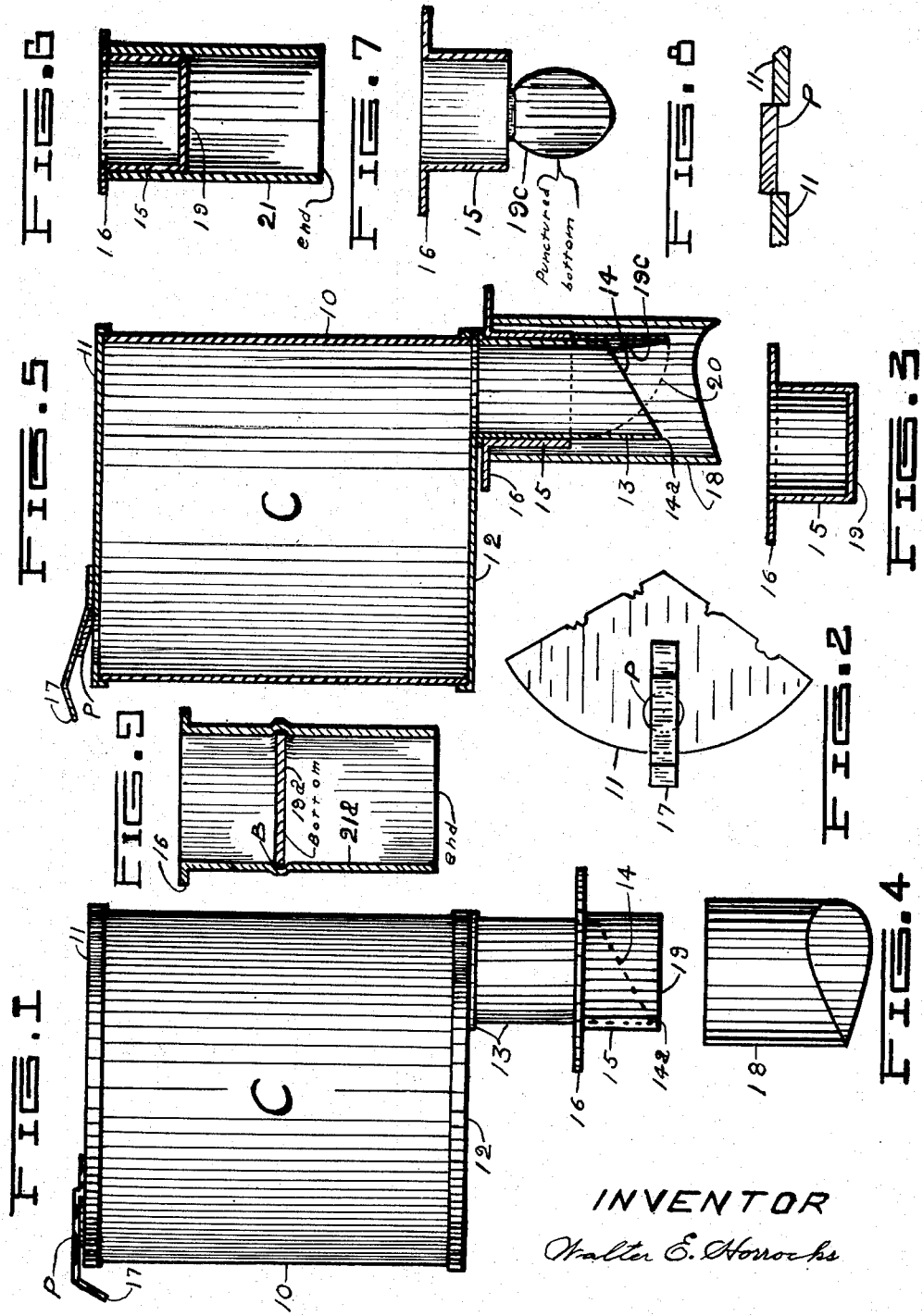

2,687,828

UNITED STATES PATENT OFFICE 2,687,828

CONTAINER

Walter E. Horrocks, Lakewood, Ohio

Application December 1, 1950, Serial No. 198,661

12 Claims. (Cl. 222—83)

My invention is a sealed container provided with interior cutting means.

An important object is to provide a container having puncturing and cutting means sealed within the container.

Another important object is to provide a container having a spout provided with means adapted to puncture and cut an aperture through the sealing means from the inside and bend the punctured portion towards the outside.

Another object is to provide a container provided with a spout for breaking the seal of the container by applying axial pressure against the container.

Another object is to provide a container provided with a sealing cap terminating into a spout to which axial pressure may be applied for breaking the seal of the container.

Another object is to provide a container with a sealing cap adapted to be punctured from the inside.

Another object is to provide a container provided with a sealing cap that after being punctured will serve as a spout.

A still further object is to provide a container provided with a sealing cap having means adapted to resist axial thrust pressure.

Other objects and advantages of the invention will be apparent during the course of the following description.

In the accompanying drawing forming a part of this specification, and in which like numerals are employed to designate like parts throughout the same.

Figure 1 is a side elevation showing a container employing my invention.

Figure 2 is a plan view showing a segment of the bottom provided with a knock-out plug and a clip for removing the plug for providing a vent inlet means.

Figure 3 is a longitudinal sectional view showing a flanged sealing cap.

Figure 4 is a side elevation showing a portion of a tubular receiving tube.

Figure 5 is a vertical longitudinal section showing a container inserted in a tubular receiving receptacle.

Figure 6 is a longitudinal section showing a flanged sealing cap with a spout.

Figure 7 is a longitudinal section showing the approximate relation of the punctured bottom portion of a sealing cap after being punctured.

Figure 8 is an enlarged view in section showing a knock-out vent plug.

Figure 9 is a vertical longitudinal sectional view of a flanged sealing cap provided with a raised bottom.

In the accompanying drawing which illustrates examples of the invention without defining its limits, Fig. 1 shows a container C having a body portion 10 provided with a base or bottom portion 11, which can be provided with vent means in the form of a knock-out plug P, and a top portion 12 which has a tubular spout portion 13 attached thereto, and an outlet aperture is provided in the top portion 12 to coincide with the wall of the tubular spout portion 13. The tubular spout portion 13 is preferably cut at an acute angle as shown at 14 which provides a cutting edge on the tubular spout portion 13 and a puncturing edge as shown at 14a. The spout portion 13 of the container C is sealed on the end with a cap portion as shown in Fig. 3 in which the tubular wall 15 surrounds the tubular wall of the spout portion 13 with the bottom 19 in proximity to the puncturing edge 14a and the outwardly projecting flange 16 providing a means to rest on the top end of a receiving receptacle 18 as shown in Fig. 5.

Fig. 2 shows a portion of the bottom 11 which may include inlet means for providing a vent, dependent upon the uses to which the container is to be applied, in which P indicates a knock-out plug attached to a clip 17 which in turn is attached to the bottom 11 by spot welding or other substantial means.

Fig. 3 shows a form of sealing cap in which the wall 15 is to be tight fitted, but slideable under axial pressure on the spout 13.

Fig. 4 shows a tubular element 18 such as is employed on automobiles for funneling oil to the crank case.

Fig. 5 shows the container C after the flanged sealing cap portion shown in Fig. 3 has been inserted into the tubular receiving element 18 with the flange 16 resting on the top end of the receiving element 18 and axial pressure has been applied to the bottom portion 11 which initially forces the spout portion 13 (its puncturing edge 14a) and the cutting edge 14 of the spout portion 13 through the bottom 19 of the sealing cap portion and also pushes the bottom 19 of the sealing cap portion to one side of the aperture that is formed by the tubular spout portion 13 cutting through the bottom 19 of the sealing cap portion as is shown at 19c in which the dotted line 20 shows the line of travel of the bottom portion 19 of the sealing cap portion after being punctured and cut by the edges 14a and 14 of the tubular spout portion 13, and the knock-out plug P has been severed from the body 11 by prying up on the end of the clip 17 which provides a vent in the container C.

Fig. 6 illustrates a sealing cap provided with a raised bottom 19 by press fitting the cap shown in Fig. 3 tightly in a tubular sleeve 21 which raises the bottom 19 up from the end of the sealing cap.

Fig. 7 illustrates the sealing cap which is shown in Fig. 3 after the bottom 19 has been punctured and cut by the tubular spout portion 13 in which a portion of the bottom 19 remains attached to the wall 15 of the sealing cap substantially as is shown and prevents the punctured bottom portion 19c from becoming detached from the wall 15 of the sealing cap.

Fig. 8 illustrates a portion of the bottom 11 in which provision for a vent may be incorporated if so required by forming a knock-out plug P therein in which the thin connecting portions surrounding the plug P can be pried away from the bottom 11 by the clip or strap element 17, as is shown in Fig. 5.

Fig. 9 illustrates a sealing cap provided with a raised bottom 19a inserted in a tubular sleeve 21a in which an outwardly projecting bead B is rolled after which the bottom 19a is inserted by introducing the bottom 19a therein in a crowned contour and then straightening out the crowned contour into a flat contour to wedge within the bead B, after which the bottom 19a may be made tight with the sleeve 21a by methods suitable for joining the various elements from which the cap may be manufactured, such as for tin, soldering, for ferrous metals, brazing, and for paper, gluing or wax cementing. If so desired the flange 16 shown in the cap in Fig. 3 may be omitted and the cap inserted without the flange 16 in either of the sleeves 21 or 21a as the case may be, to provide a raised bottom relative to the ends of the sleeves shown in Fig. 6 and Fig. 9. The sealing caps constructed as outlined above provides an extended spout which extends beyond the punctured raised bottom 19a, due to the top (or flanged) end of the sealing cap contacting the top end 12 of the container C such as when axial pressure is applied to the bottom 11 of the container C to force the cutting edges 14a and 14 through the raised bottom 19 or 19a as the case may be.

In containers such as are used to contain pourable substances, such as for example, oil, which is extensively used in individual cans for replenishing automobile crank case oil, it is the usual custom to use a separate can opener in which the operator first punctures a vent hole in one edge of the can and then inserts the spouted can opener in the opposite edge of the can so as to pour the oil into the receiving tube of the crank case. When automobile owners purchase canned oil as outlined above it is necessary to have at hand a suitable can opener, or in lieu thereof he is obliged to use other means for puncturing the can to allow of the oil in the container to be poured into the crank case receiving tube. This procedure by the motorist is usually a messy and undesirable accomplishment.

In order to eliminate the above procedure my invention provides a means whereas all of the implements for containing the oil and releasing the oil from the container are contained in one complete unit or package. The oil can be introduced into the container through the tubular spout 13 and then the spout is closed with the selected type of tight fitting sealing cap, which ever is preferred for the intended uses. The selected sealing cap is pressed over the spout 13 so that the puncturing edge 14a of the spout 13 is in proximity to the bottom 19, or 19a of the selected sealing cap. When it is desired to empty the oil into the crank case of an automobile, the container C is positioned over the intake tube 18 of the crank case, and the sealing cap, or the sealing caps with the extended spouts, as the case may be, is inserted into the tubular element 18 of the crank case with the flange 16 of the sealing cap resting on the top edge of the tubular receiving tube 18, then pressure is applied to the bottom 11 of the container C, such as substantial axial pressure of the hand, or a rap on the bottom 11 with the fist which forces the puncturing edge 14a and the cutting edge 14 of the spout 13 through the bottom 19 or 19a, as the case may be, and thence pushes the punctured bottom 19c sideways against the interior side of the tubular receiving element 18, or the extended spouts 21 or 21a, as the case may be. The oil then flows through the punctured aperture made in the bottom of the cap and passes through the tubular receiving element 18 to the crank case. In order to allow of the oil to flow quickly, the clip 17 on the bottom side of the container C is bent upward to pry out the knock out plug P and provide a vent into the body of the container. After the oil is drained from the container it can be withdrawn from the tubular receiving element 18 and discarded without the messy job of cleaning or storing individual spouted cutters, or can openers.

It is to be noted that I have shown the tubular spout 13 positioned in the top of the container for conveniently pouring oil into a crank case which allows of the container spout to be inserted into tubular receiving elements so as the body portion 10, will avoid any close surrounding objects which would possibly interfere if the spout 13 was located in the center of the container, although this location of the spout need not be, or is intended to be confined to the position as shown. The location of the spout as shown lends itself to the total draining of the container such as when the tubular receiving element 18 is located in a slanting position. The container as shown discloses a flat top which provides an economical shape to manufacture, but it is to be noted that the tops can be made in the shapes of frustrums of cones with the spout 13 attached thereto, or terminating in a spout.

In the foregoing description as an illustrative example of my invention I have described an enclosing structure for containing and discharging oil but the invention is not to be limited to this use and application as the structures can be used for containing other flowable or pourable substances, such as beverages and granular substances; and the apertures for releasing the beverages can be punctured and cut by utilizing the sealing caps with the extended spouts as shown in Fig. 6 and Fig. 9 and applying axial pressure to the end of the extended spout, such as thrusting the end of the spout against the under side of a table, or any convenient horizontal object, in preference to applying axial hand pressure thereto, and the ends of the extended spouts 21 or 21a may be sealed with an auxiliary cap if all of the contents of the containers are not required for instant use, such as using a similar cap as shown in Fig. 3, or using a threaded cap in which case the end of the extended spouts 21 and 21a are to have a thread rolled on the ends to accommodate the threaded auxiliary cap. The knock-out plug or vent means in containers for this described use can therefore be dispensed with as the contents can be poured out through the spout 21 or 21a in the same manner as beverages are poured from bottles. The containers may be made from a combination of different elements, such as constructing the body portion from paper products with a metal spout attached to provide substantial cutting and puncturing means for puncturing and cutting an aperture from the inside of the container. The sealing cap may be additionally hermetically sealed to the spout with substances, such as soft solder, or cellulose and similar substances including sealing wax compositions, applied around the spout at the top edge of the sealing cap so that they will yield to an axially applied pressure on the container, or the extended spout, as the case may be, and will be broken allowing the sealing cap to slide on the spout.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims, and I reserve the right to the use of various elements, or combination of elements, for constructing the containers without departing from the scope of the appended claims.

Having described my invention, what I claim and desire to secure by Letters Patent is as follows in which I claim:

1. A container comprising in combination, a body portion, said body portion having venting means, a top portion provided with an outlet aperture, a tubular spout portion attached to the top portion and surrounding the outlet aperture, puncturing means on the end of the spout portion, and sealing means comprising a cap portion covering the end of the spout portion and surrounding the puncturing means.

2. A container comprising in combination, a body portion, said body portion having a top portion provided with an outlet aperture, a tubular spout portion attached to the top portion and surrounding the outlet aperture, puncturing means on the end of the spout portion, and sealing means comprising a cap portion covering the end of the spout portion and surrounding the puncturing means.

3. A container comprising in combination, a body portion, said body portion having venting means, a top portion provided with an outlet aperture, a tubular spout portion attached to the top portion and surrounding the outlet aperture, puncturing means on the end of the spout portion, and sealing means comprising a cap portion covering the end of the spout portion and surrounding the puncturing means, with the cap portion provided at its top end with a projecting flange.

4. A container comprising in combination, a body portion, said body portion having a top portion provided with an outlet aperture, a tubular spout portion attached to the top portion and surrounding the outlet aperture, puncturing means on the end of the spout portion, and sealing means comprising a cap portion covering the end of the spout portion and surrounding the puncturing means, with the cap portion provided at its top end with a projecting flange.

5. A container comprising in combination, a body portion, said body portion having venting means, a top portion provided with an outlet aperture, a tubular spout portion attached to the top portion and surrounding the outlet aperture, puncturing means on the end of the spout portion, and sealing means comprising a tubular cap portion surrounding and extending below the pucturing means, provided with a raised bottom covering the end of the puncturing means.

6. A container comprising in combination, a body portion, said body portion having a top portion provided with an outlet aperture, a tubular spout portion attached to the top portion and surrounding the outlet aperture, puncturing means on the end of the spout portion, and sealing means comprising a tubular cap portion surrounding and extending below the puncturing means, provided with a raised bottom covering the end of the puncturing means.

7. A container comprising in combination, a body portion, said body portion having venting means, a top portion provided with an outlet aperture, a tubular spout portion attached to the top portion and surrounding the outlet aperture, puncturing means on the end of the spout portion, and sealing means comprising a tubular cap portion surrounding and extending below the puncturing means, provided with a raised bottom covering the end of the puncturing means, with the cap portion provided at one end with a projecting flange.

8. A container comprising in combination, a body portion, said body portion having a top portion provided with an outlet aperture, a tubular spout portion attached to the top portion and surrounding the outlet aperture, puncturing means on the end of the spout portion, and sealing means comprising a tubular cap portion surrounding and extending below the puncturing means, provided with a raised bottom covering the end of the puncturing means, with the cap portion provided at one end with a projecting flange.

9. A container comprising in combination, an outlet means, a spout connected to the container about the outlet means, puncturing means on the end of the spout, and sealing means providing a cap fitted over the end of the spout, above and below the puncturing means.

10. A sealed container having tubular outlet means sealed with a slidable sealing cap, and puncturing means arranged about the end of the said outlet means in such a manner that the puncturing means will puncture the sealing cap from the inside and bend the punctured portion of the sealing cap outwardly when axial pressure is applied to the said container.

11. A container comprising a body including sides, top and bottom portions, said top portion provided with an outlet aperture, a tubular spout portion attached to said top portion and surrounding the outlet aperture, puncturing means on the outer end of said spout portion, and sealing means comprising a cap portion covering the end of said spout portion and surrounding the puncturing means for axial movement with respect to said spout for puncturing said sealing means.

12. A container comprising a body including sides, top and bottom portions, said body having venting means therefor, said top portion provided with an outlet aperture, a tubular spout portion attached to said top portion and surrounding the outlet aperture, puncturing means on the outer end of said spout portion, and sealing means comprising a cap portion covering the end of said spout portion and surrounding the puncturing means for axial movement with respect to said spout for puncturing said sealing means.

References Cited in the file of this patent

UNITED STATES PATENTS

| Number | Name | Date |
|---|---|---|
| 1,674,596 | Johnson | June 19, 1928 |
| 1,773,263 | Dister | Aug. 19, 1930 |
| 1,925,466 | Simpson | Sept. 5, 1933 |
| 1,960,230 | Claytor | May 29, 1934 |
| 1,989,715 | Statham | Feb. 5, 1935 |
| 2,073,292 | Waite et al. | Mar. 9, 1937 |
| 2,153,263 | Martter et al. | Apr. 4, 1939 |
| 2,185,180 | Brennan | Jan. 2, 1940 |
| 2,245,698 | Miller | June 17, 1941 |
| 2,496,258 | Alexander | Feb. 7, 1950 |
| 2,543,427 | Warne | Feb. 27, 1951 |